United States Patent [19]

Smithkey, Jr.

[11] 3,830,276
[45] Aug. 20, 1974

[54] TIRE WITH FOLDED BREAKER BELT SPLICING

[75] Inventor: John C. Smithkey, Jr., North Canton, Ohio

[73] Assignee: The Goodyear Tire & Rubber Company, Akron, Ohio

[22] Filed: Aug. 20, 1973

[21] Appl. No.: 389,856

[52] U.S. Cl. ............................ 152/361 FP, 156/134
[51] Int. Cl. .............................................. B60c 9/18
[58] Field of Search ................. 152/361 R, 361 FP; 156/134, 133

[56] References Cited
UNITED STATES PATENTS
2,982,327   5/1961   Vanzo et al.......................... 152/361

*Primary Examiner*—Robert B. Reeves
*Assistant Examiner*—Hadd S. Lane
*Attorney, Agent, or Firm*—F. W. Brunner; R. S. Washburn

[57] ABSTRACT

Technique of splicing a folded breaker belt in place on the building drum, which, contrary to prior teaching, is equally effective, less costly, and facilitates automated splicing of such folded belts in tire building. A single triangular end of an under folded ply is lapped over and upon a similar single triangular end of an over-folded ply to effect the splice, making the folded belt endless.

3 Claims, 4 Drawing Figures

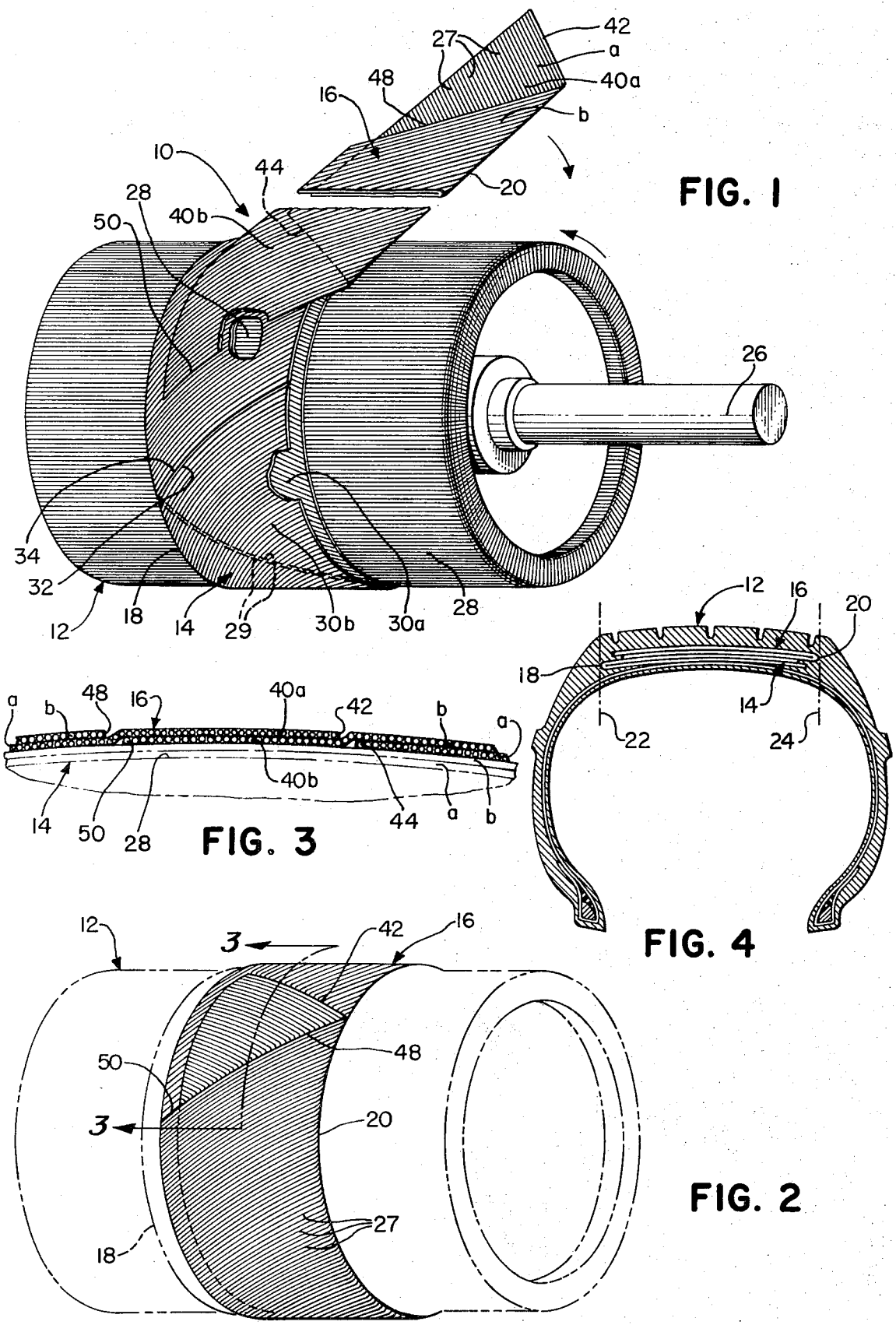

3,830,276

TIRE WITH FOLDED BREAKER BELT SPLICING

The present invention relates to building pneumatic tires and particularly to tires having therein at least one endless folded breaker belt and specifically to an improved splice joining the respective ends of such a folded belt in a tire.

BACKGROUND OF THE INVENTION

Breaker belts which are folded or doubled along a line parallel to their length prior to assembly into a tire have heretofore been found useful and can be arranged in a tire in several different ways known to persons skilled in the art.

Heretofore, one of the tire builder's most difficult and time consuming tire machine operations has been that of forming a splice between the respective ends of a folded tire breaker belt.

This operation requires the operator manually to open, that is, to unfold an overlying portion of a first end of the folded belt, then to position the underlying portion of the other end of the belt close to the underlying portion of the first end, and then to refold the previously unfolded overlying portion of the first end close to the overlying portion of the other end. The aim of this operation is to position the cord elements of each of the respective ends in close side-by-side parallel relation in each of the inner and outer parts of the folded belt. When properly accomplished, each of the inner and outer parts of the folded belt is circumferentially continuous and at the same radial level with respect to the tire axis. The operation not only requires undue time and effort by the tire builder, but can result in undesirable distortions of one end or both ends of the folded belt being spliced.

SUMMARY OF THE INVENTION

A principal object of the present invention is to have more effective use of the tire builder's time and effort by eliminating the time and effort in the above-described operation and to achieve a tire wherein the splice of the breaker belt is in no way diminished in quality or performance.

The foregoing object as well as further objects and advantages which will become apparent are accomplished in accordance with the invention by folding a belt of ply material along a fold line extending longitudinally thereof such that the cord elements of the ply material make equal and opposite acute angles with such fold line in respectively radially inner and outer ply parts of the belt and such that a triangular tab or extension of single ply is formed at each of the ends of the belt, then laying the so folded belt on and circumferentially about the crown portion of the tire with the fold line disposed in a plane perpendicular to the tire axis, and superimposing the single ply tab of the radially inner ply part upon, that is, radially outwardly of, the single ply tab of the outer ply part to effect a splice joining the respective ends to form an endless inextensible belt.

To acquaint persons skilled in the art with the principles of the invention, the following description which includes the attached drawings, sets forth a preferred embodiment representing the present best mode of practice thereof, by way of illustration, not to be considered as limiting the invention, the scope of which is pointed out in the appended claims.

In the drawings, FIGS. 1 and 2 are schematic perspective views of a tire belt being applied upon the crown portion of a tire in accordance with principles of the invention;

FIG. 3 is a section view taken as illustrated by the line 3—3 of FIG. 2; and

FIG. 4 is an axial cross-section view of a tire in accordance with the invention.

Referring to the drawings and particularly to FIGS. 1 and 2, a crown portion 10 of a tire 12 in accordance with the invention is illustrated. In FIG. 1, a pair of previously folded breaker belts 14,16 have fold lines 18,20 each of which will lie respectively in one of the planes 22,24 perpendicular to the tire axis 26 and circumferentially of the tire in the shoulder region thereof.

The cord elements 27 of each belt form acute angles equal and opposite with respect to the fold line of the particular belt and extend in two ply parts a and b laterally of the fold line one of which will lie radially inwardly (a) and the other of which will lie radially outwardly (b) in the folded belt on the underlying surface 28. The respective ends of each of the belts terminate parallel to a cord which, before the folding of the belt, lies at an acute angle with respect to the length of the belt. After folding, the belt at each of its ends has a generally triangular tab or extension in one of its ply parts which extends circumferentially of the tire and longitudinally of the belt beyond the end of the other ply part thus forming a single ply tab. As will be apparent from FIGS. 1 and 2, the folded belt 14, shown already in place on the crown portion 10 in the figures, can be wound about the tire 12 readily in such a manner that the terminals edges 29 of the inner ply part a lie close to and parallel to each other at the same radial distance from the tire axis while the tab 30b of the outer ply portion b overlies the tab 30a of the inner ply portion a with its endmost edge 32 close and parallel to the terminal edge 34 of the outer ply portion b. Thus, this belt can be applied to the underlying crown of the tire without further manipulation and without the above-described difficulties.

The relative position of the splice in the belt 14 is shown displaced angularly about the tire 12 from its normal position 180° away from the splice of the belt, for clarity.

The triangular tab 40b of the belt 16, being applied over the belt 14 on the crown portion 10, as seen in FIGS. 1 and 2, is formed by the outer (b) of the two-ply portions of the belt and, in applying the belt to the tire crown portion, is adhered to the surface of the belt 14. As the folded belt 16 is then wrapped about the tire, the triangular tab 40a formed by the radially inner ply portion a of the belt will, if the above-mentioned manipulation is not carried out, overlap the tab 40b of the outer ply portion as may be seen in FIG. 3. Heretofore, it has been regarded as necessary, to achieve a satisfactory splice of the folded belt in the completed tire, to peel back the first tab 40b, usually manually, so that the other tab 40a can be adhered directly to the underlying surface 28 after which the initial tab 40b of the outer ply b is repositioned to overlie the tab 40a and thus form a splice of the same character as that of the belt 14.

In accordance with the invention, and surprisingly in view of the prior art teaching, the efficiency of the operation can be markedly improved and the quality of the tire thus produced be not in any way harmfully affected, and even be improved, by leaving the adhered tab 40b undisturbed and disposing the trailing end tab 40a of the inner ply portion *a* over and upon the adhered tab 40b. The splice formed in this manner is illustrated in FIGS. 2 and 3 wherein the cords 27 of the inner ply portion *a* are stepped radially outwardly and the cords of the outer ply portion *b* are stepped radially inwardly. In the completed splice, the terminal edge 42 of the portion *a* of the belt 16 lies parallel to the edge 44, but is separated therefrom by the portion *b* of the belt 16. Similarly, the terminal edge 48 of the portion *b* of the belt 16 lies parallel to the terminal edge 50 of the portion *b* of the belt 16, but is separated therefrom by the portion *a* of 16. Surprisingly, this apparent and conspicuous irregularity in the disposition of the tabs 40a,40b is not only a considerably more efficient manufacturing operation but has proved to be without undesirable effect in the quality and uniformity of the resulting tire.

The splice described in accordance with the invention makes possible mechanizing the application of the folded belt to the crown of the tire without manual intervention since, as will be immediately apparent to persons skilled in this art, the belt can be applied by any of a variety of known belt applying mechanisms such as for example an elongated transfer conveyor or a belt transferring roll which can transfer the previously folded belt from a conveying surface to the surface of the tire crown in the same manner as is now used to apply single, that is, not folded, belt plies.

The present invention is concerned with a tire having a folded belt the ends of which folded belt are joined to form a splice of unique character and with the method of constructing such splice. The particular arrangement of the folded belts 14,16 with respect to each other and to the tire can be varied as desired both as to number of such belts and as to the relative positions of such belts in the tire, which tire can, of course, also include additional components well known in the art.

While certain representative embodiments and details have been shown for the purpose of illustrating the invention, it will be apparent to those skilled in the art that various changes and modifications may be made therein without departing from the spirit or scope of the invention.

What is claimed is:

1. A method of building a tire having at least one breaker belt which belt is before its assembly in the tire folded along a fold line to be disposed in a plane normal to the tire axis, the method comprising, folding the belt at said fold line with cord elements thereof making equal and opposite acute angles with said fold line in respectively radially inner and outer ply parts of the so-folded belt so as to form a triangular single ply tab at each of the ends of said belt, laying the so-folded belt on and circumferentially about a crown portion of said tire, and superimposing the single ply tab of the inner ply part upon and radially outwardly of the single ply tab of the outer ply part to effect a splice joining the respective ends to form an endless inextensible breaker belt.

2. A method as claimed in claim 1, wherein said belt is first cut to length and then is folded along said fold line.

3. In a pneumatic tire having at least one inextensible breaker belt which belt is before its assembly in the tire folded along a fold line to be disposed in a plane perpendicular to the axis of the tire, such belt being folded to form at each of its ends a triangular single ply tab of one of the two ply portions thereof, the improvement comprising a splice joining the respective ends of said belt wherein the triangular tab of the inner of the two ply portions is lapped radially outwardly of and on the corresponding triangular tab of the outer ply portion of the so-folded belt.

* * * * *